United States Patent
Ing et al.

(10) Patent No.: US 7,831,710 B2
(45) Date of Patent: Nov. 9, 2010

(54) COMMUNICATION OF OFFLINE STATUS BETWEEN COMPUTER SYSTEMS

(75) Inventors: Albert Ing, Wappingers Falls, NY (US); Gregory F. Pfister, Austin, TX (US); Patrick Sugrue, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 12/036,633

(22) Filed: Feb. 25, 2008

(65) Prior Publication Data

US 2009/0216873 A1 Aug. 27, 2009

(51) Int. Cl.
*G06F 15/16* (2006.01)
*G06F 15/173* (2006.01)
*G06F 15/177* (2006.01)

(52) U.S. Cl. .............. 709/224; 370/216; 370/230; 709/227; 709/249; 714/724; 714/25

(58) Field of Classification Search ......... 709/217–228, 709/249; 714/25, 724; 370/216, 230
See application file for complete search history.

(56) References Cited

U.S. PATENT DOCUMENTS

| | | | |
|---|---|---|---|
| 6,912,604 B1 | 6/2005 | Tzeng et al. | |
| 7,093,024 B2 | 8/2006 | Craddock et al. | |
| 7,116,673 B2 | 10/2006 | Kashyap et al. | |
| 7,145,837 B2 | 12/2006 | Herring et al. | |
| 7,290,077 B2 | 10/2007 | Gregg et al. | |
| 7,343,515 B1 * | 3/2008 | Gilbertson et al. | 714/10 |
| 7,480,840 B2 * | 1/2009 | Hathorn et al. | 714/724 |
| 7,496,045 B2 * | 2/2009 | Boyd et al. | 370/242 |
| 7,555,566 B2 * | 6/2009 | Blumrich et al. | 709/249 |
| 2003/0005039 A1 | 1/2003 | Craddock et al. | |
| 2003/0016669 A1 | 1/2003 | Pfister et al. | |
| 2003/0031183 A1 | 2/2003 | Kashyap et al. | |
| 2003/0093627 A1 | 5/2003 | Neal et al. | |
| 2004/0022184 A1 * | 2/2004 | Van Lieu et al. | 370/216 |
| 2004/0146006 A1 * | 7/2004 | Jackson | 370/230 |
| 2005/0038883 A1 | 2/2005 | Elko et al. | |
| 2006/0031521 A1 * | 2/2006 | Wilk | 709/227 |
| 2006/0045089 A1 * | 3/2006 | Bacher et al. | 370/392 |
| 2007/0067678 A1 * | 3/2007 | Hosek et al. | 714/25 |
| 2009/0204875 A1 * | 8/2009 | Burrow et al. | 714/799 |
| 2009/0217096 A1 * | 8/2009 | Ing et al. | 714/37 |

* cited by examiner

*Primary Examiner*—Haresh N Patel
(74) *Attorney, Agent, or Firm*—Cantor Colburn LLP; Steven Chui

(57) ABSTRACT

A method for communication of offline status between nodes includes detecting an impending deactivation of a physical port and sending a message from a sending node to a receiving node notifying the receiving node of the impending deactivation of the physical port. The method further includes deactivating the report of any error for the physical port and sending a response from the sending node to the receiving node verifying that deactivation of the physical port.

9 Claims, 6 Drawing Sheets

FIG. 5

| MAD FIELD NAME | DESCRIPTION |
|---|---|
| MAD_TYPE | DIAGNOSTIC LOG MAD |
| MAD_MODIFIER | TELLS WHAT PORT IS TO BE TAKEN OFF-LINE |
| SPARE [27] | USER-DEFINED SPACE |

COMMUNICATION OF OFFLINE STATUS BETWEEN COMPUTER SYSTEMS

BACKGROUND OF THE INVENTION

This invention relates generally to inter-computer communications, and more particularly to providing a method, system and computer program product for communication of offline status between computer systems.

Diagnosing errors in inter-computer communication links is often difficult because the site where an error is detected is often not where the error is actually occurring. For example, one side of a communication link may send a message to another and expect a reply, but never receive one. The error is likely to be on the other side, but the sending side detects the error.

The situation is often complicated by several factors. One such factor is the difficulty in correlating any log information on both sides of the communication link because separate logs are based on time clocks that are not synchronized. Another factor is that the different sides can be physically distant from one another, from across a room from one another to kilometers apart. In the latter case in particular, the time delay in communication substantially increases the difficulty of correlating error indications on the two sides of the communication link. A root issue, however, is that error detection is on one side of a communication link while the error cause is on the other.

In addition, cases are regularly encountered which are not adequately anticipated and covered by the responses and diagnostics preprogrammed or built into the communications system. Exemplary situations that typically cause problems include a silent (e.g., unlogged) drop of a message by the recipient node for reasons unknown, and a message exchange sequence that exhibits unanticipated delays or hangs.

It is regularly the case that communication links between active computer systems must be taken out of service at scheduled times for a variety of reasons, such as physical rerouting, replacement with new cabling, upgrading of hardware to which they are attached, firmware or software modifications, etc. Simply unplugging the link, producing a link failure that is most often implicitly detected by timeouts, will result in re-establishment of communication using different paths, (assuming the communications fabric is sufficiently redundant).

However, the scope of error recovery may have to extend beyond low-level infrastructure into the application itself, particularly because of the delays intrinsically involved in timeouts. Many applications normally lack such recovery, resulting in application failure. This is clearly undesirable. If applications fail, a customer can rightly consider a system "down" even if its communications subsystem or operating system remains operational. Such situations are even less desirable when the change, and resultant errors, were planned. For example, the change may be an upgrade or other modification of the system, planned months in advance. As is well known, planned downtime is currently a significant fraction of all system downtime.

It would be desirable to be able to improve the communication of status between computer systems.

BRIEF SUMMARY OF THE INVENTION

Embodiments of the present invention provide a method, system and computer program product for communication of offline status between computer systems.

An exemplary embodiment includes a method for communication of offline status between computer systems includes detecting an impending deactivation of a physical port and sending a message from a sending node to a receiving node notifying the receiving node of the impending deactivation of the physical port. The method further includes deactivating the report of any error for the physical port and sending a response from the sending node to the receiving node verifying that deactivation of the physical port.

Another exemplary embodiment includes a system for communication of offline status between computer systems. Briefly described, in architecture, one embodiment of the system, among others, can be implemented as follows. The system includes a sending node in communication with a receiving node over a communication link. The sending node detects an impending deactivation of a physical port and sends a message to the receiving node notifying the receiving node of the impending deactivation of the physical port. The receiving node deactivates the report of any error for the physical port, and sends a response from the sending node to the receiving node verifying that deactivation of the physical port.

A further exemplary embodiment includes a computer program product for communication of offline status between computer systems, the computer program product comprising: a computer-readable storage medium for storing instructions for diagnosing communications, the diagnosing communications comprising a method of detecting an impending deactivation of a physical port, and sending a message from a sending node to a receiving node notifying the receiving node of the impending deactivation of the physical port. The method further includes deactivating the report of any error for the physical port, and sending a response from the sending node to the receiving node verifying that deactivation of the physical port.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 illustrates a fields used in a diagnostic log message in exemplary embodiments.

DETAILED DESCRIPTION OF EXEMPLARY EMBODIMENTS

An exemplary embodiment of the present invention provides a diagnostic message that one computer system can send to another upon detection of approaching offline status between computer systems.

The invention described here addresses this problem by providing messages that signal to the systems involved that a link will be taken down. This early notification allows the propagation of the need to change to, e.g., the communications subsystems and/or an operating system to take action ahead of time, by switching communication to a different (redundant) link before a link is taken down or taking some other action. It also allows those higher-level systems to detect when no such action is possible, allowing them to alert an operator or system administrator that the action they are intending to take will cause applications to fail.

The invention consists of procedures and facilities causing computer system B (which detects the approaching offline status) to send to computer system A, a message containing information identifying the approaching offline status. In an alternative embodiment, the message may include a time stamp indicating when the approaching offline status will happen. This data can be used to take action ahead of time, by switching communication to a different (i.e. redundant) link before the approaching off-line link is taken down. Computer system A sends back an off-line response to indicate that the approaching off-line status is acknowledged. If necessary, computer system A can send a response back to computer system B, identifying any application that will fail if the approaching off-line status occurs.

The result of these actions is that as much information about the approaching off-line status is available on both sides of the link, greatly enhancing the ability of mechanisms to take action ahead of time to avoid unnecessary link analysis or application failure.

Figure 1:
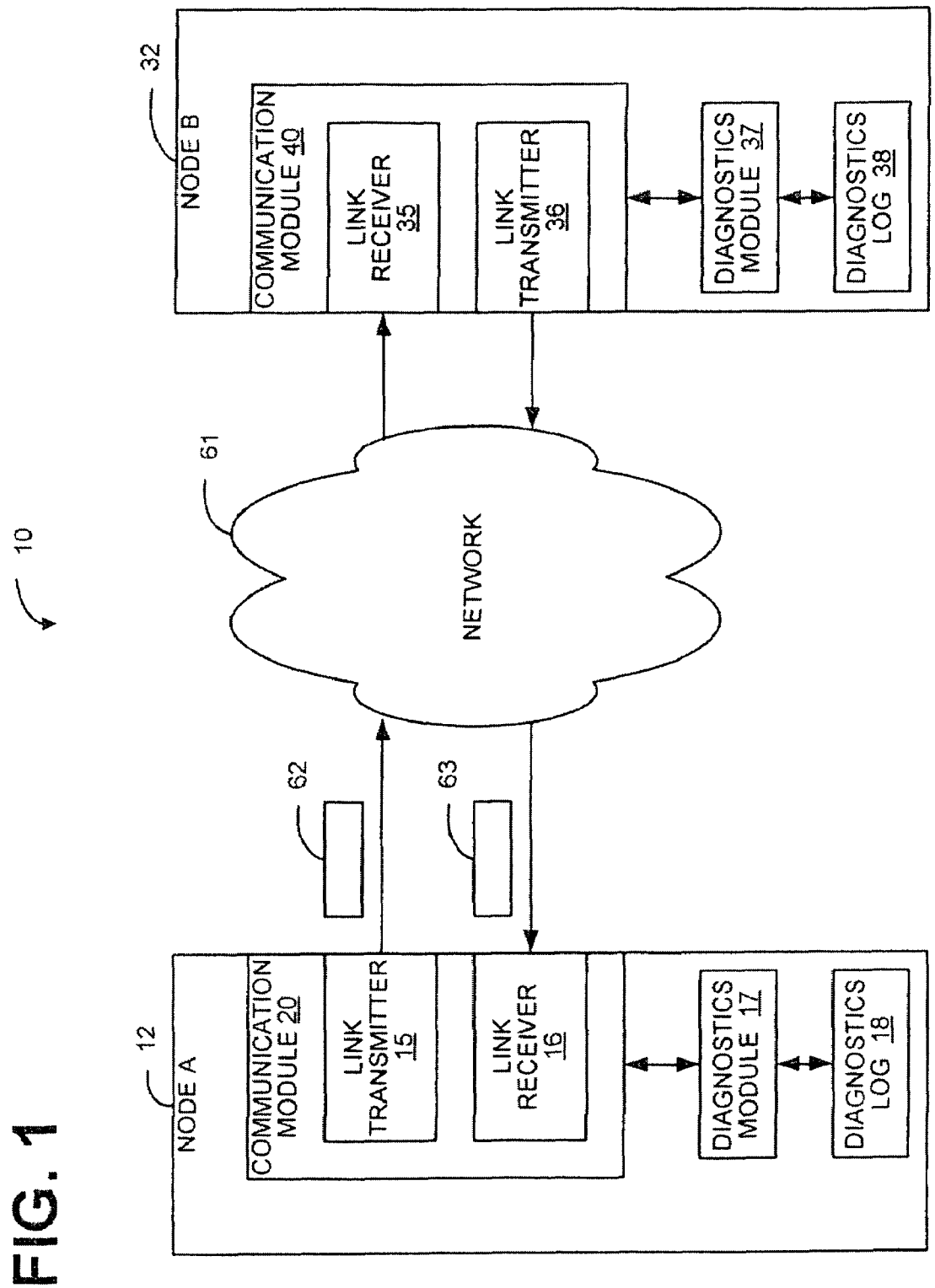
FIG. 1 is a block diagram of a system for diagnosing communications in an exemplary embodiment.

FIG. 1 is a block diagram of a system 10 for communications in an exemplary embodiment. First node 12 and second node 32 may be implemented using a variety of processor-enabled devices such as for example, but not limited to: mainframes, PCs, workstations, laptops, handheld computer, pocket PCs, PDAs, pagers, WAP devices, non-WAP devices, cell phones, palm devices and the like. As illustrated, nodes 12 and 32 are data processing systems (i.e. processing circuits) suitable for storing and/or executing program code will include at least one processor coupled directly or indirectly to memory elements through a system bus.

The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system 10 directly or through intervening I/O controllers. Finally, the I/O devices may further include devices that communicate both inputs and outputs, for instance but not limited to: a link transmitter/receiver, a NIC or modulator/demodulator for accessing remote devices, other files, devices, systems, or a network; a radio frequency (RF) or other transceiver; a telephonic interface; bridge, router or the like.

Both first node 12 and second node 32 include communication modules 20 and 40 that handle the sending and receiving of messages 62 and 63 over network 61. The communication modules 20 and 40 may be implemented in software and/or hardware. When the communication modules 20 and 40 are implemented in software, it should be noted that the communication modules 20 and 40 can be stored on virtually any computer readable medium for use by or in connection with any computer related system or method.

In the context of this document, a computer readable medium is an electronic, magnetic, optical, or other physical device or means that can contain or store a computer program for use by or in connection with a computer related system or method. As illustrated in FIG. 1, communication modules 20 and 40 utilize link transmitters 15 and 36 and link receivers 16 and 35 coupled to the nodes 12 and 32 to enable the nodes to become coupled to each other, other data processing systems, remote printers or storage devices through intervening private or public networks.

A first node 12 is in communication with a second node 32 over a network 61. It is understood that both node 12 and node 32 can send and receive communications and implement the processes described herein. Node 12 is referred to as the sending node 12 and node 32 is referred to as the receiving node 32 for ease of describing processes occurring when node 12 sends a message to node 32.

In the exemplary embodiment of the present invention, the receiving node 32 sends a message to the sending node 12 when it is determined that any physical port will be taken off-line. In the exemplary embodiment of the present invention, the firmware in the physical port will transmit an off-line message indicating that the physical port is being gracefully taken off-line; however, in general, the port being taken off-line need not be the port sending or receiving the message. The sending node 12 upon reception of the offline message that a physical port is being taken off-line and notes not to create a first failure data capture log or report an error. However, in an alternative embodiment, the sending node 12 verifies that the off-line port will not cause any applications to fail and notifies the operator if failure will happen. The sending node then sends an off-line response back to the receiving node 32. The receiving node 32 then gracefully takes the physical port, off-line.

Network 61 may be an internal network such as a local area network (LAN) within an organization, an external network, or a combination of both and may have other physical machines or devices (not shown) coupled to it. In an exemplary embodiment, communications modules 20 and 40 support an INFINIBAND architecture with network 61 being an INFINIBAND link. It is understood that other communication protocols may be used, and embodiments are not limited to INFINIBAND applications. The INFINIBAND architecture is described in the InfiniBand standard, which is hereby incorporated by reference.

The diagnostic logs 18 and 38 store diagnostic log events. The diagnostic log event instructs nodes 12 and 32 of the types of data that should be logged in order to diagnose communication errors. The diagnostic logs 18 and 38 may be implemented in software and/or hardware. When the diagnostic logs 18 and 38 are implemented in software, it should be noted that the diagnostic logs 18 and 38 can be stored on virtually any computer readable medium for use by or in connection with any computer related system or method. More examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROMs, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

The diagnostic modules 17 and 37 may be implemented in software and/or hardware. When the diagnostic modules 17 and 37 are implemented in software, it should be noted that the diagnostic modules 17 and 37 can be stored on virtually any computer readable medium for use by or in connection with any computer related system or method. The diagnostic module 37 in the receiving node 32 uses locally generated message information (e.g., type of message, time of message, etc.) along with information in the diagnostic log event to diagnose a communication error, and then sends that information to the sending node 12. The diagnostic module 17 in the sending node 12 uses message information (e.g., type of message, time of message, etc.) log a communication error, and then sends a response to the receiving node 32.

In the event that a communication of a physical port approaching off-line status, data can still be transmitted from the receiving node 32 sending node 12 to the sending node 12. In exemplary embodiment, the communications network 61 is physically duplexed. Communication network 61 includes two separate bundled physical links, one used for transmission in one direction, and the other used for reception in the other direction.

Figure 2:
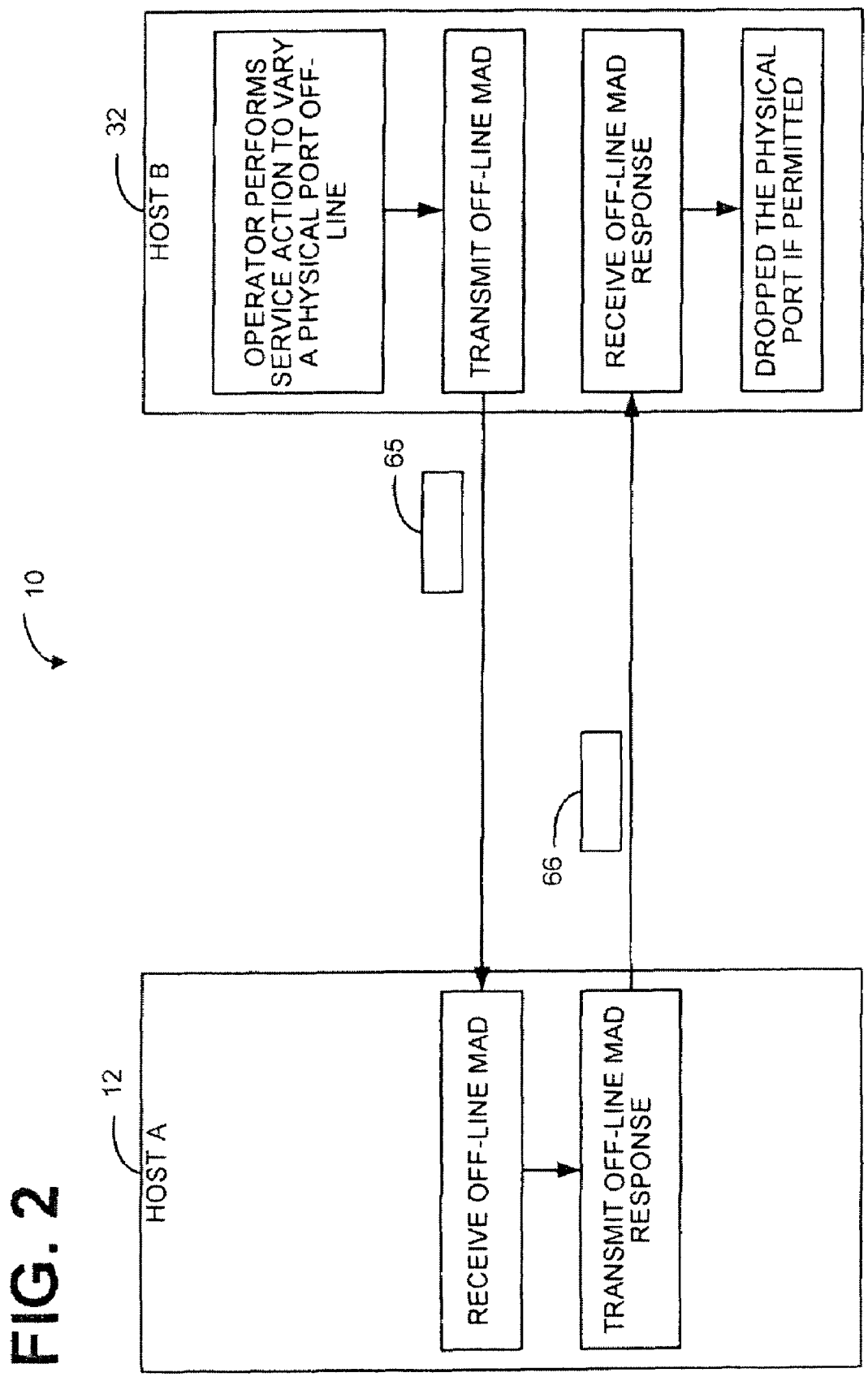
FIG. 2 is a block diagram illustrating signal flow between two nodes in an exemplary embodiment.
Figure 3:
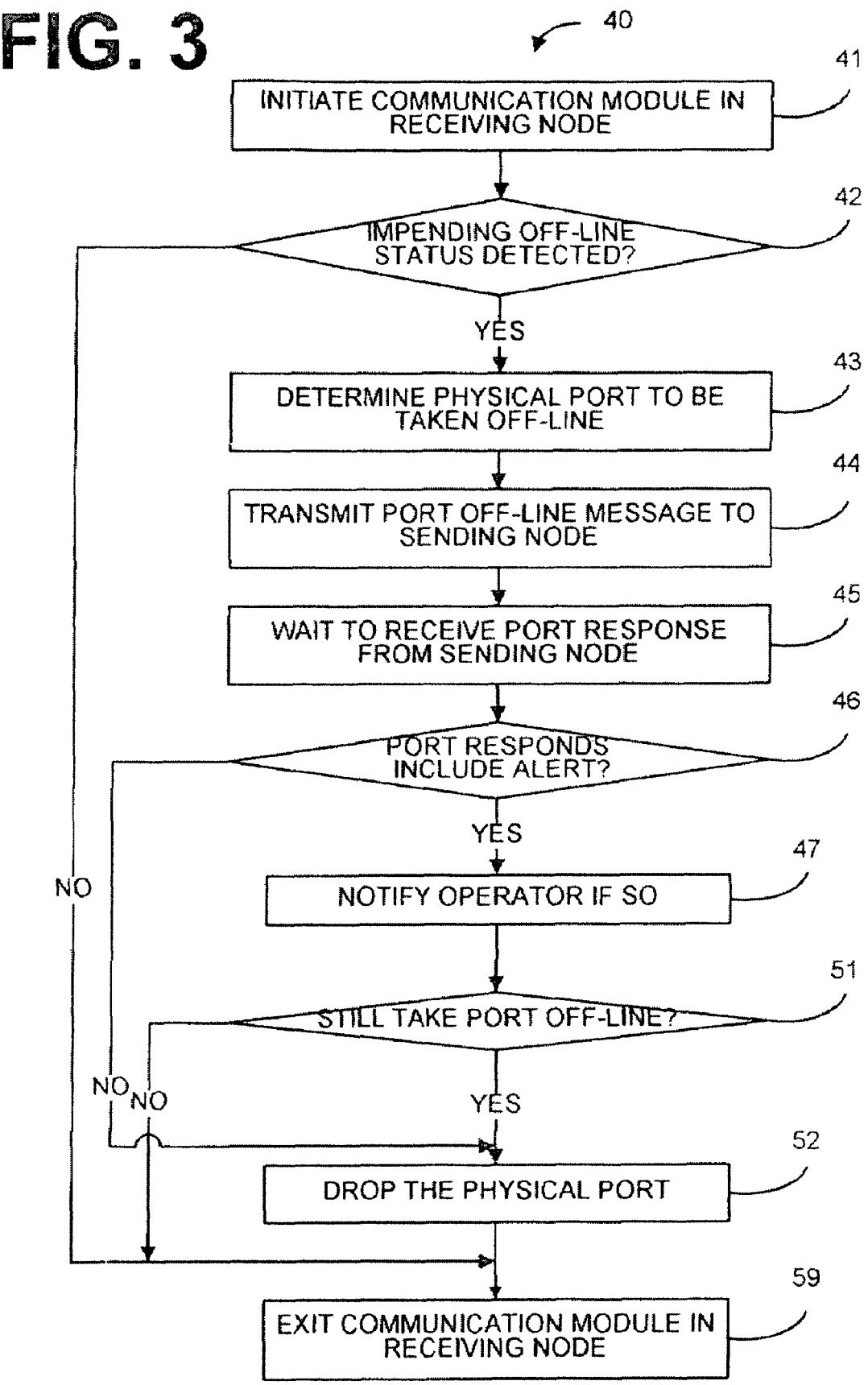
FIG. 3 is a flow chart illustrating the operation of an exemplary embodiment of the diagnostics module in the receiving node according to the principles of the present invention, as shown in FIGS. 1 and 2.
Figure 4:
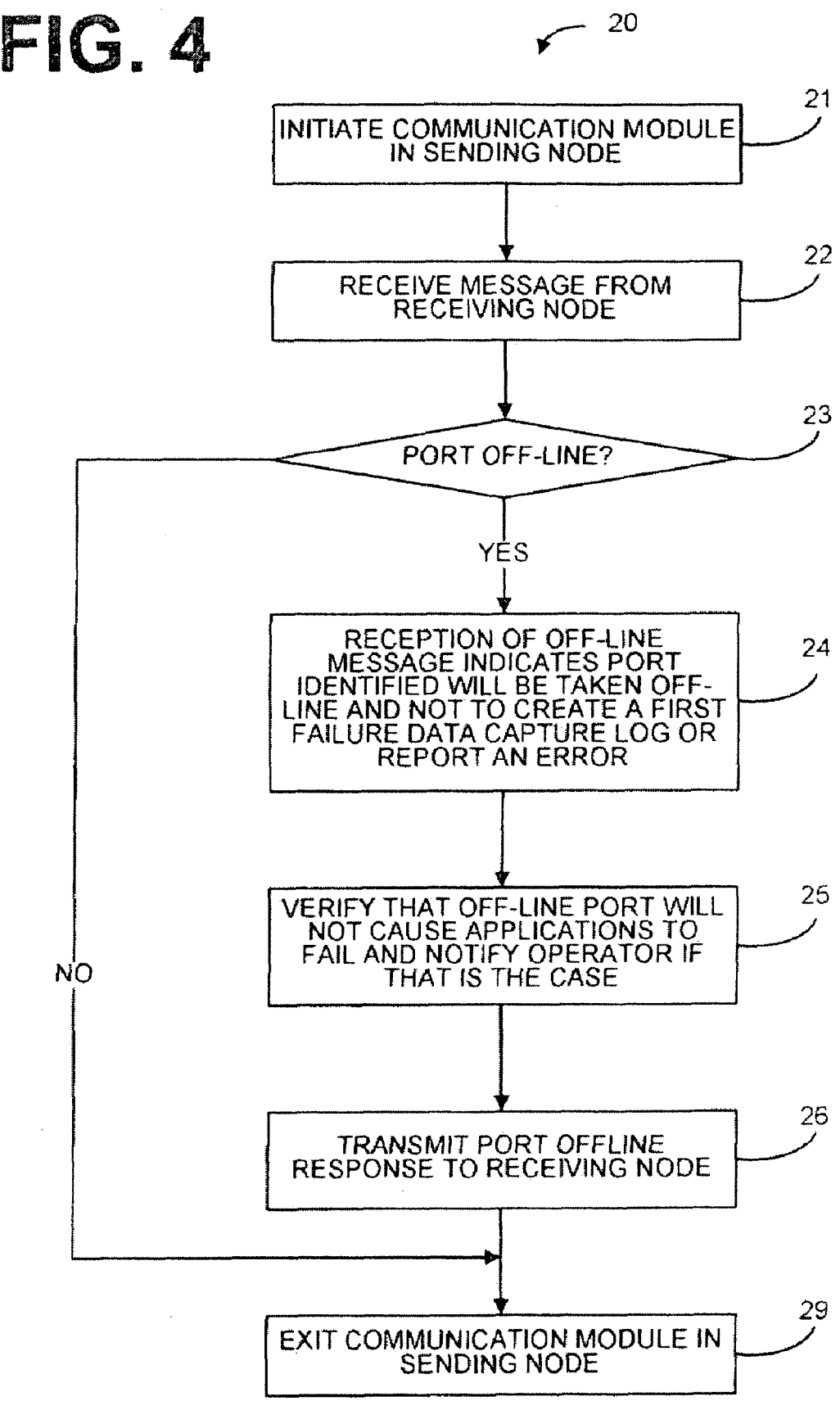
FIG. 4 is a flow chart illustrating the operation of an exemplary embodiment of the diagnostics module in the sending node according to the principles of the present invention, as shown in FIGS. 1 and 2.

FIGS. 2-4 illustrate examples of off-line status messaging between sending node 12 and receiving node 32. In the exemplary embodiment of the present invention, the receiving node 32 detects an impending physical port off-line status and then sends an off-line message to the sending node 12.

As described further below, upon detecting an impending physical port off-line status the receiving node 32 determine the ID of the physical port to be taken off-line, and sends a off-line message to sending node 12. The off-line message contains information identifying the ID of the physical port to be taken off-line as seen by receiving node 32. On receipt of the off-line message, the sending node 12 indicates not to create first failure data capture log or report an error.

Sending node 12 or receiving node 32 may send an impending physical port off-line status message automatically, as part of its response to detecting the impending off-line status. Alternatively, either sending node 12 or receiving node 32 may send the off-line status message to alert an operator or system administrator. The latter is particularly useful in situations where what is going on may cause applications to fail.

Given the impending physical port off-line status message from sending node 12 or receiving node 32, diagnostic modules 17 and 37 are alerted to not execute diagnostic procedures on sending node 12 or receiving node 32.

FIG. 2 illustrates signal flow between two nodes in an exemplary scenario where the receiving node 32 detects an impending physical port off-line status. A physical port off-line status can be caused, for example, but not limited to, by an operator action. As shown in FIG. 2 the receiving node 32 detects the impending physical port off-line status. The receiving node 32 captures the ID of the physical port to be taken off-line. The receiving node 32 then transmits an off-line message 65 indicating the impending off-line status of a physical port to the sending node 12.

The sending node 12 receives the off-line message from the receiving node 32. In response, sending node 12 notes not to create a first failure data capture log or report an error. However, in an alternative embodiment, the sending node 12 verifies that the off-line port will not cause any applications to fail and notifies the operator if failure will happen. The sending node then sends an off-line response 66 back to the receiving node 32. In less alert to the application failure, the receiving module 32 proceeds with taking the physical port off-line.

FIG. 3 is a flow chart illustrating the operation of an exemplary embodiment of the communication module 40 in the receiving node 32 according to the principles of the present invention, as shown in FIGS. 1 and 2.

First at step 41, the communication module 40 is initialized. This initialization includes the startup routines and processes embedded in the BIOS of the receiving node 32. The initialization also includes the establishment of data values for particular data structures utilized in the communication module 40.

Next, the receiving node 32 determines at step 42 if it detects an impending physical port off-line status. If an impending physical port off-line status is not detected at step 42, the communication module 40 then skips to exit 59.

However, if it is determined that any physical port will be taken off-line; the communication module 40 determines the ID of the physical port to be taken off-line at step 43. At step 44, a port off-line message is sent to sending node 12 to alert operators, system administrators and applications of the impending physical port deactivation.

At step 45, the communication module 40 waits to receive a port response from the sending node 12. The communication module 40 may then check to see if the port response includes alerts at step 46. If it is determined at step 46 that there are no alerts in the port response, the communication module 40 proceeds to step 52 to deactivate (i.e., drop) the physical port.

However, if it is determined at step 46 that the port response does include alert, the communication module 40 then notifies the operator (step 47), system administrator or affected applications of the impending physical port deactivation. At step 51, the communication module 40 determines whether the physical port is still to be taken off-line. If it is determined at step 51 that the physical port is not to be taken off-line, then the communication module 40 then skips to step 59 to exit.

However, if it is determined that the physical port is to be taken off-line, then the communication module 40 then deactivates (i.e. drops) the physical port at step 52. At step 59, the communication module 40 then exits.

FIG. 4 is a flow chart illustrating the operation of an exemplary embodiment of the communication module 20 in the sending node 12 according to the principles of the present invention, as shown in FIGS. 1 and 2.

First at step 21, the communication module 20 is initialized. This initialization includes the startup routines and processes embedded in the BIOS of the receiving node 12. The initialization also includes the establishment of data values for particular data structures utilized in the communication module 20.

At step 22, the communication module 20 receives a message from the receiving node 32. Next, the sending node 12 determines at step 23 if it detects if the message is an off-line message. If it is determined at step 23 that the message is not an off-line message, then the communication module 20 then skips to step 29 to exit. However, if it is determined at step 23 that the message received is a port off-line message, then the communication module 20 indicates (step 24) that a first failure data capture log or reporting of an error will not occur for the loss of the physical port indicated.

At step 25, the communication module 20 verifies that the indicated physical port impending off-line status will not cause applications to fail and creates an alert if that is the case. The alert can be sent to be operator, system administrator or as messages to any applications that could fail if the physical port is deactivated. The alert can also be set to the receiving node 32 in the port off-line response, at step 26.

At step 29, the communication module 20 then exits.

FIG. 5 illustrates the off-line message in exemplary embodiments. The off-line message is in the form of a management datagram having a number of fields. The first field, mad_type, identifies the management datagram as a physical port off-line message. The second field, mad_modifier, indicates an alert that deactivation of the physical port will cause applications to fail. The remaining is reserved for specific vendor implementation.

Technical effects and benefits of embodiments include the ability to diagnose message failures by forcing a receiving node to log information as specified by the sending node. This information is then returned to the sending node to facilitate diagnosis of the message error using data from both the sending node and the receiving node.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 6:
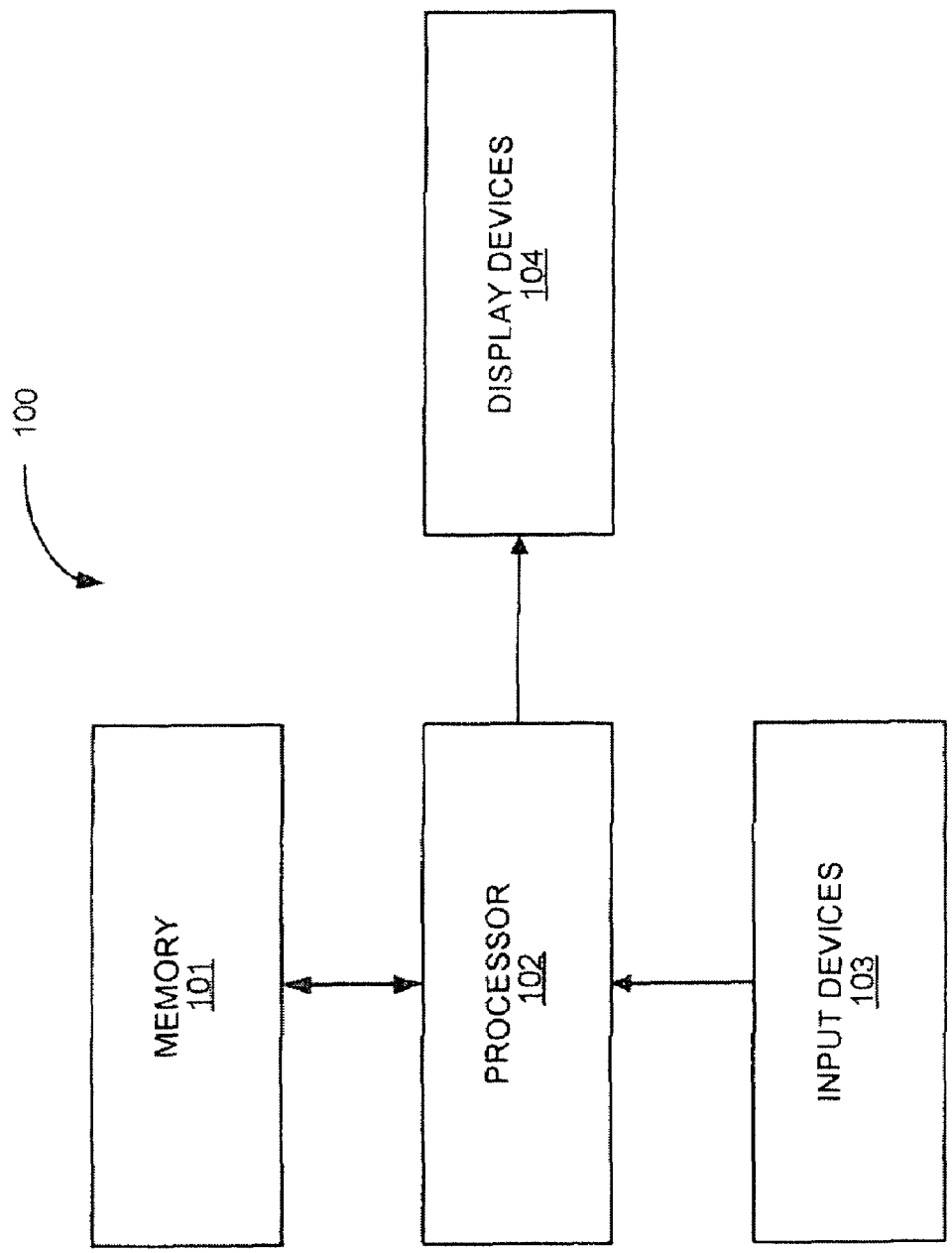
FIG. 6 illustrates a computer apparatus, according to an example embodiment.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 6 illustrates a computer apparatus, according to an exemplary embodiment. Therefore, portions or the entirety of the methodologies described herein may be executed as instructions in a processor 102 of the computer system 100. The computer system 100 includes memory 101 for storage of instructions and information, input device(s) 103 for computer communication, and display device 104. Thus, the present invention may be implemented, in software, for example, as any suitable computer program on a computer system somewhat similar to computer system 100. For example, a program in accordance with the present invention may be a computer program product causing a computer to execute the example methods described herein.

The computer program product may include a computer-readable medium having computer program logic or code portions embodied thereon for enabling a processor (e.g., 102) of a computer apparatus (e.g., 100) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for communication of offline status between nodes, the method comprising:

detecting by a device an impending deactivation of a physical port;

sending a message from a sending node to a receiving node notifying the receiving node of the impending deactivation of the physical port;

deactivating by the receiving node the report of any error for the physical port;

sending a response from the sending node to the receiving node verifying that deactivation of the physical port; and identifying by the receiving node software applications that will fail based on the impending deactivation of the physical port;

wherein the message includes a field identifying an alert to application failure if the physical port is deactivated; and wherein at least one of: the alert causes the receiving node to notify an operator of the application failure and the alert causes the sending node to notify an operator of the application failure.

2. The method of claim 1 wherein: the message is a management datagram having a number of fields, a first field identifying the management datagram as an off-line message.

3. The method of claim 2 wherein the first field identifies the physical port to be deactivated.

4. A system for communication of offline status between nodes, the system comprising:

a sending node of a device in communication with a receiving node over a communication link;

the sending node detects an impending deactivation of a physical port;

the sending node sends a message to the receiving node notifying the receiving node of the impending deactivation of the physical port;

the receiving node deactivates the report of any error for the physical port;

the receiving node sends a response from the sending node to the receiving node verifying that deactivation of the physical port; and the receiving node identifies software applications that will fail based on the impending deactivation of the physical port;

wherein the message includes a field identifying an alert to application failure if the physical port is deactivated; and wherein at least one of: the alert causes the receiving node to notify an operator of the application failure and the alert causes the sending node to notify an operator of the application failure.

5. The system of claim 4 wherein: the message is a management datagram having a number of fields, a first field identifying the management datagram as an off-line message.

6. The system of claim 5 wherein: the first field identifies the physical port to be deactivated.

7. A computer program product for communication of offline status between nodes, the computer program product comprising:

a non-transitory storage medium readable by a processing circuit and storing instructions for execution by the processing circuit for performing a method comprising:

detecting an impending deactivation of a physical port;

sending a message from a sending node to a receiving node notifying the receiving node of the impending deactivation of the physical port;

deactivating by the receiving node the report of any error for the physical port;

sending a response from the sending node to the receiving node verifying that deactivation of the physical port; and identifying by the receiving node software applications that will fail based on the impending deactivation of the physical port;

wherein the message includes a field identifying an alert to application failure if the physical port is deactivated; and wherein at least one of: the alert causes the receiving node to notify an operator of the application failure and the alert causes the sending node to notify an operator of the application failure.

8. The computer program product of claim 7 wherein the message is a management datagram having a number of fields, a first field identifying the management datagram as an off-line message.

9. The computer program product of claim 8 wherein the first field identifies the physical port to be deactivated.

* * * * *